(12) United States Patent
Baldacchini et al.

(10) Patent No.: US 8,441,630 B2
(45) Date of Patent: May 14, 2013

(54) SYSTEM AND METHOD FOR MONITORING IN-SITU PROCESSING OF SPECIMENS USING COHERENT ANTI-STOKES RAMAN SCATTERING (CARS) MICROSCOPY

(75) Inventors: Tommaso Baldacchini, Irvine, CA (US); Ruben Zadoyan, Irvine, CA (US)

(73) Assignee: Newport Corporation, Irvine, CA (US)

( * ) Notice: Subject to any disclaimer, the term of this patent is extended or adjusted under 35 U.S.C. 154(b) by 306 days.

(21) Appl. No.: 12/778,074

(22) Filed: May 11, 2010

(65) Prior Publication Data

US 2011/0267683 A1 Nov. 3, 2011

Related U.S. Application Data

(60) Provisional application No. 61/330,274, filed on Apr. 30, 2010.

(51) Int. Cl.
*G01J 3/44* (2006.01)

(52) U.S. Cl.
USPC ............................................. 356/301

(58) Field of Classification Search ........... 356/300–318
See application file for complete search history.

(56) References Cited

U.S. PATENT DOCUMENTS

| 6,108,081 | A | 8/2000 | Holtom et al. |
| 7,436,501 | B2 * | 10/2008 | Hashimoto et al. ............. 356/73 |
| 7,542,137 | B2 | 6/2009 | Murugkar et al. |

OTHER PUBLICATIONS

Baldacchini, Tommaso et al., "Characterization of Microstructures Fabricated by Two-Photon Polymerization Using Coherent Anti-Stokes Raman Scattering Microscopy", J. Phys. Chem. B 2009, Aug. 31, 2009, vol. 113, pp. 12663-12668.

Potma, Eric O. et al., "Chemical Imaging of Photoresist with Coherent Anti-Stokes Raman Scattering (CARS) Microscopy", J. Phys. Chem B 2004, Dec. 25, 2003, vol. 108, pp. 1296-1301.

Baldacchini, Tommaso et al., "Characterization of Microstructures Fabricated by Two-Photon Polymerization Using Coherent Anti-Stokes Raman Scattering", Aug. 31, 2009, pp. 12663-12668, vol. 113, Publisher: J. Phys. Chem. B 2009, Published in: US.

Baldacchini, Tommaso et al., "CARS Microscopy Deep in Microstructures", May 1, 2009, Publisher: Laser Focus World, Published in: US.

Baldacchini, Tommaso et al., "Chemical mapping of three-dimensional microstructures fabricated by two-photon polymerization using CARS microscopy", "Laser Applications in Microelectronic and Optoelectronic Manufacturing VII", Feb. 12, 2009, pp. 1-10, vol. 7201, No. 72010Q, Publisher: SPIE, Published in: US.

Baldacchini, Tommaso et al., "In situ and real time monitoring of two-photon polymerization using broadband coherent Anti-Stokes Scattering Microscop", "Optics Express 19219", Aug. 25, 2010, vol. 18, No. 18, Publisher: Optical Society of America, Published in: US.

* cited by examiner

*Primary Examiner* — Tara S Pajoohi Gomez
(74) *Attorney, Agent, or Firm* — Fountain Law Group, Inc.; George L. Fountain

(57) ABSTRACT

System and method are disclosed for in-situ monitoring of a specimen while undergoing a defined process. The system includes a processing system adapted to perform the defined process on the specimen, and a coherent anti-Stokes Raman scattering (CARS) microscopy system adapted to in-situ monitor the specimen. In another aspect, the CARS microscopy system is adapted to in-situ monitor the specimen simultaneous with the defined process being performed on the specimen by the processing system. In still another aspect, the CARS microscopy system is adapted to perform a measurement of the specimen while the defined process being performed on the specimen is paused or temporarily halted.

19 Claims, 4 Drawing Sheets

SYSTEM AND METHOD FOR MONITORING IN-SITU PROCESSING OF SPECIMENS USING COHERENT ANTI-STOKES RAMAN SCATTERING (CARS) MICROSCOPY

CROSS-REFERENCE TO A RELATED APPLICATION

This application claims the benefit of the filing date of Provisional Patent Application, Ser. No. 61/330,274, filed on Apr. 30, 2010, which is incorporated herein by reference.

FIELD

This disclosure relates generally to in-situ process monitoring, and in particular, to a system and method of monitoring an in-situ processing of a specimen using coherent anti-Stokes Raman scattering (CARS) microscopy.

BACKGROUND

Advancement in the manufacturing of microelectronic circuits have been significant over the past three decades. Currently, millions of transistors are routinely fabricated into integrated circuits, such as, for example, those typically used as microprocessors. Microelectronic manufacturing techniques typically employ photolithography and electron beam lithography to perform most of the manufacturing of today's integrated circuits.

However, there are drawbacks associated with standard microelectronic manufacturing techniques. For instance, these manufacturing techniques are generally not capable of creating complex three-dimensional structures. Additionally, standard microelectronic manufacturing techniques are typically not able to form curved and/or uneven shapes. Furthermore, these fabrication techniques are incompatible with many chemical and biological environments.

A distinct manufacturing technology that is gaining recent popularity is two-photon polymerization (TPP). TPP has several advantages over standard microelectronic fabrication techniques. For instance, TPP manufacturing techniques provide for the creation of complex three-dimensional microstructures. These techniques also allow the production of geometries with essentially no topological constraints and with a dimensional resolution smaller than 100 nanometers (nm). Such complex three-dimensional microstructures may be coated with electrical conductors and/or semiconductors for uses in microelectronic and photonic applications. Additionally, TPP may have applications in the field of biomedicine, including drug delivery and tissue engineering.

TPP essentially entails a nonlinear interaction of light with a photosensitive material, such as resin. In particular, near-infrared photons are used to induce two-photon absorption in molecules (e.g., photoinitiators) in acrylic-based resin, beginning a polymerization process. In such process, highly cross-linked polymers are formed. More specifically, while an acrylic-based resin specimen is subjected to a TPP process, carbon-carbon double bonds are homolytically cleaved by action of radicals, forming multiple new carbon-carbon single bonds. The TPP process entails the use of an ultra-short pulsed laser and strong focusing lens to subject the specimen with the corresponding radiation to achieve very accurate geometries. The non-polymerized material of the specimen may be removed using solutions to leave the freestanding structure. It shall be understood that TPP may be applied to other types of resins and other materials.

The characterization, monitoring, and optimization of TPP processes are issues that are typically given considerable attention. For instance, attention is often given to how to characterize and measure the mechanical properties of specimens undergoing TPP processes. Also, attention is often given to how to improve or optimize a TPP process on a particular specimen. Additionally, attention is often given to how the solvent used to remove the non-polymerized material affects the remaining structure. Conventional inspection methods, such as bright-field transmission light microscopy and scanning electron microscopy (SEM), may not be able to accurately address these issues. For instance, bright-field transmission light microscopy may not provide sufficient detail to enable a three-dimensional view of the specimen. SEM may not provide sufficient detail about the structural information of the specimen.

SUMMARY

An aspect of the disclosure relates to a system and method for in-situ monitoring of a specimen while undergoing a process. The system comprises a processing system adapted to perform a defined process on the specimen, and a coherent anti-Stokes Raman scattering (CARS) microscopy system adapted to in-situ monitor the specimen. In another aspect, the CARS microscopy system is adapted to in-situ monitor the specimen simultaneous with the defined process being performed on the specimen by the processing system. In still another aspect, the CARS microscopy system is adapted to perform a measurement of the specimen while the defined process being performed on the specimen is paused or temporarily halted.

In another aspect of the disclosure, the system further comprises a scanning mechanism adapted to subject distinct portions of the specimen to the in-situ monitoring by the CARS microscopy system. In one aspect, the scanning mechanism is adapted to move the specimen. In another aspect, the scanning mechanism is adapted to steer an incident radiation beam directed at the specimen by the CARS microscopy system. In still another aspect, the scanning mechanism is adapted to steer both a Stokes radiation beam and a pump radiation beam directed at the specimen by the CARS microscopy system.

In another aspect of the disclosure, the CARS microscopy system comprises a Stokes beam source adapted to generate a Stokes radiation beam with a frequency $\omega_S$, and a pump radiation beam adapted to generate a pump radiation beam with a frequency $\omega_P$. In one aspect, the CARS microscopy system is adapted to direct the Stokes radiation beam and the pump radiation beam to substantially the same region on the specimen. In still another aspect, the CARS microscopy system is adapted to combine the Stokes radiation beam and the pump radiation beam to generate an incident radiation beam directed at the specimen, wherein the incident radiation beam has a frequency of substantially $\omega_P - \omega_S$ or $\omega_S - \omega_P$.

In another aspect, the CARS microscopy system comprises at least one radiation source adapted to generate an incident radiation beam upon the specimen, and a detector adapted to detect radiation emitted by the specimen in response to the incident radiation beam. In one aspect, the emitted radiation by the specimen provides information regarding one or more properties of the specimen. In still another aspect, the one or more properties of the specimen comprises a density of the specimen. In yet another aspect, the specimen comprises a resin, and the one or more properties of the specimen comprises a degree of polymerization of the resin. Additionally, in another aspect, the processing system comprises a two-photon polymerization (TPP) processing system. In still another aspect, the TPP processing system is adapted to generate a TPP radiation beam for performing the TPP process on the specimen, wherein the TPP radiation beam is derived at least in part from the pump or Stokes radiation beam of the CARS system.

Other aspects, advantages and novel features of the disclosure will become apparent from the following detailed description of the invention when considered in conjunction with the accompanying drawings.

DETAILED DESCRIPTION OF THE EXEMPLARY EMBODIMENTS

Figure 1:
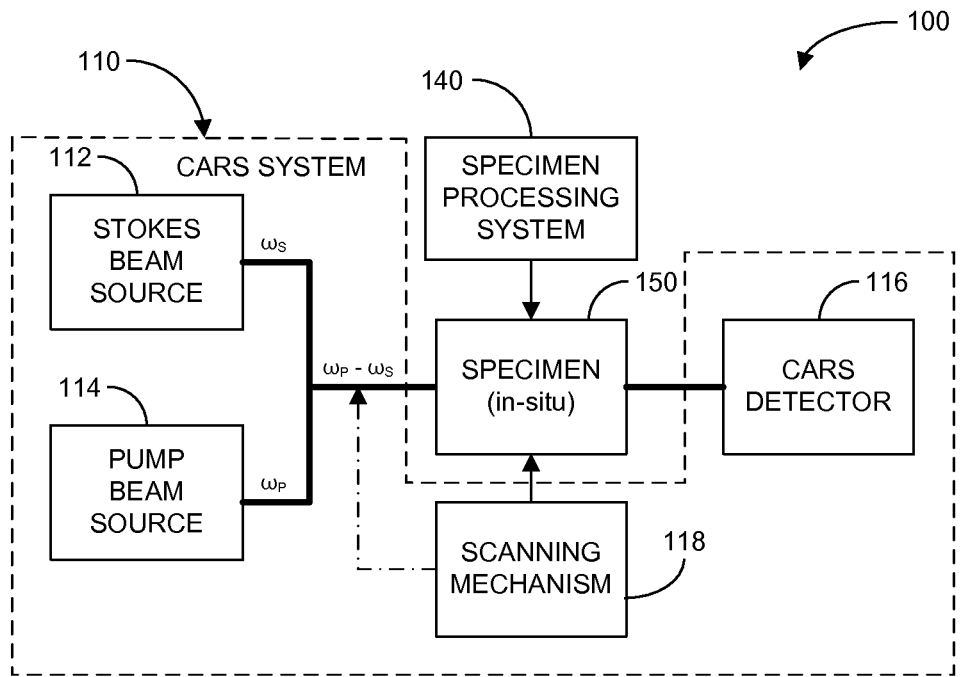
FIG. 1 illustrates a block diagram of an exemplary in-situ process monitoring system in accordance with an embodiment of the disclosure.

FIG. 1 illustrates a block diagram of an exemplary in-situ process monitoring system 100 in accordance with an embodiment of the disclosure. In summary, the in-situ process monitoring system 100 uses a coherent anti-Stokes Raman scattering (CARS) microscopy system to scan and monitor a specimen undergoing a particular process. The CARS microscopy system is able to detect one or more properties of the specimen. For instance, the CARS system is able to detect relative densities in the specimen. Thus, by monitoring a specimen in-situ undergoing a polymerization process, for example, boundaries of features in the specimen may be monitored using the CARS microscopy system. This is just one example of many applications of using a CARS microscopy system to perform in-situ monitoring of samples undergoing processes.

More specifically, the in-situ process monitoring system 100 comprises a CARS microscopy system 110 used for in-situ monitoring one or more characteristics of a specimen 150 undergoing a particular process performed by a specimen processing system 140. The CARS microscopy system 110, in turn, comprises a Stokes beam source 112, a pump beam source 114, and a detector 116; and may also include a scanning mechanism 118. The Stokes beam source 112 generates a Stokes radiation beam with a frequency $\omega_S$. The pump beam source 114 generates a pump radiation beam with a frequency $\omega_P$. The Stokes and pump beam may be combined (e.g., one modulates the other) within the CARS system 110 to generate an incident radiation beam with a frequency $\omega_P - \omega_S$ (or $\omega_S - \omega_P$) (e.g., the difference in frequency between the Stokes radiation beam and the pump radiation beam).

The frequency $\omega_P - \omega_S$ of the incident radiation signal may be tuned to substantially the frequency of a Raman active vibrational mode of at least a portion the specimen 150. The incident radiation signal interacts with the specimen 150, which, in response, emits a shorter wavelength pulse. The shorter wavelength pulse is detected by the detector 116 to ascertain information about one or more properties of the specimen 150. The scanning mechanism 118 is adapted to move the specimen 150 relative to the incident radiation beam to allow the beam to interact with different portions or regions of the specimen. The scanning mechanism 118 may perform this by actually moving the specimen 150 (e.g., by moving the structure (e.g., a stage) that supports the specimen. Alternatively, or in addition to, the scanning mechanism 118 may be able to steer the incident radiation beam.

By spatially scanning the incident radiation beam, a chemical-specific three-dimensional image of the specimen 150 may be ascertain, which describes the concentration or density of the excited molecular oscillators within the specimen. The detected signal is proportional to the square of the third-order susceptibility, and therefore strongly dependent on the number of vibrational oscillators. Thus, discontinuities in the detected signal are a direct consequence of density variations in the specimen 150. Thus, while the specimen 150 is undergoing the process performed by the specimen processing system 140, the CARS system 110 is able to generate a three-dimensional image of the density of the specimen, which is useful for many applications, such as optimizing the processing of the specimen, characterizing the structure and features of the specimen, detecting defects within the specimen, ascertaining the uniformity of the specimen, and others.

Figure 2:
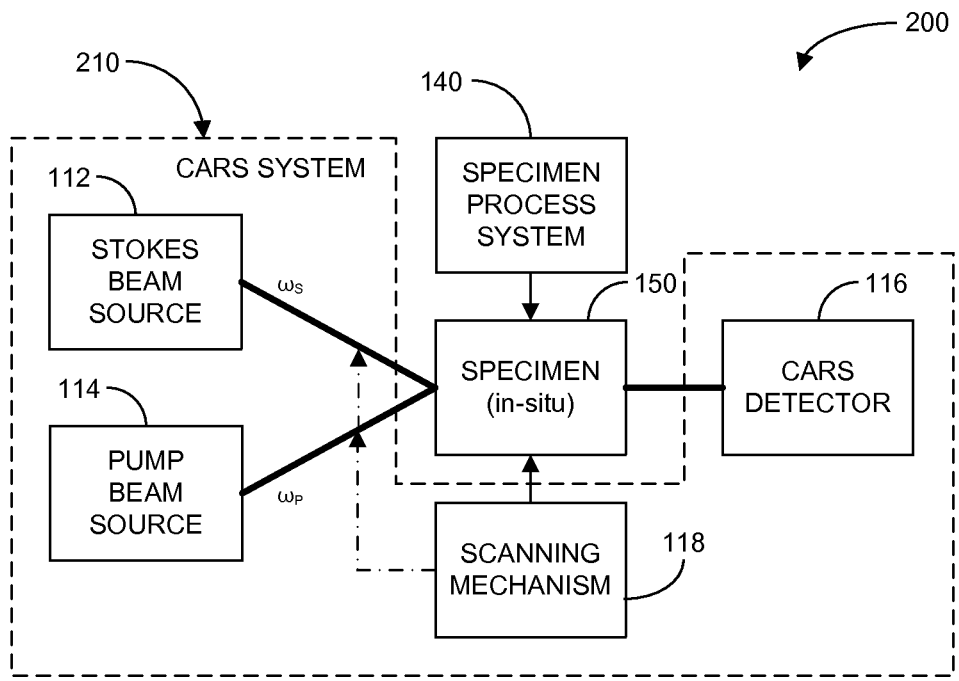
FIG. 2 illustrates a block diagram of another exemplary in-situ process monitoring system in accordance with another embodiment of the disclosure.

FIG. 2 illustrates a block diagram of another exemplary in-situ process monitoring system 200 in accordance with another embodiment of the disclosure. The in-situ process monitoring system 200 is similar to that of system 100, and includes many of the same elements as noted by the same reference numbers. A difference between the in-situ process monitoring system 200 and system 100 is that both the Stokes radiation beam and the pump radiation beam are focused upon the specimen 150. Thus, the incident radiation beam is generated at substantially the specimen 150. In this case, the scanning mechanism 118 may steer the Stokes beam and pump beam individually, although in a manner that they both are focused at substantially the same region of the specimen 150.

Figure 3A:
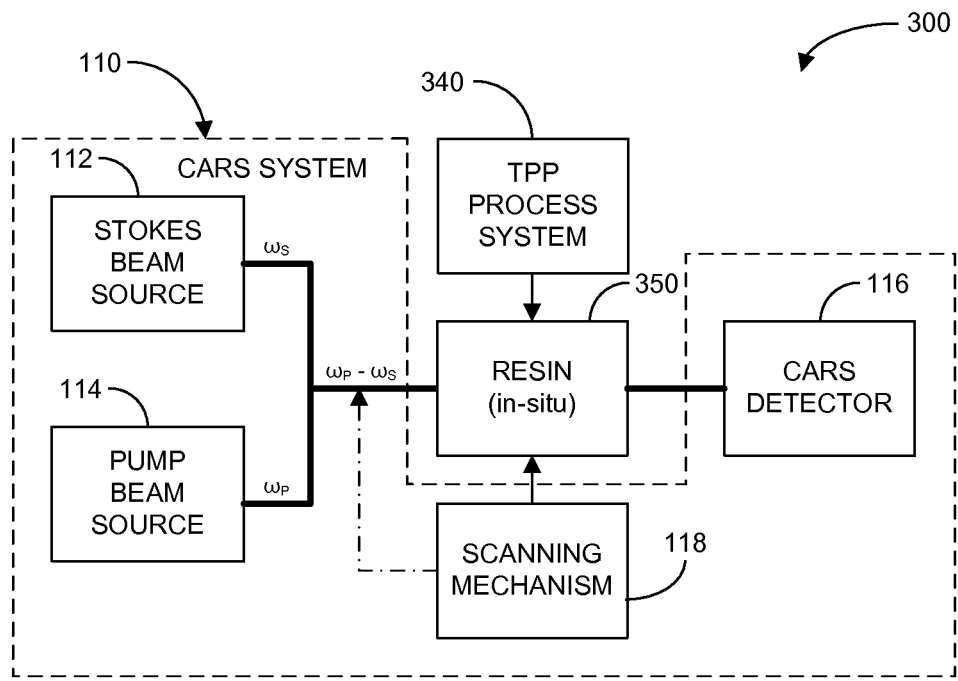
FIG. 3A illustrates a block diagram of another exemplary in-situ process monitoring system in accordance with another embodiment of the disclosure.

FIG. 3A illustrates a block diagram of another exemplary in-situ process monitoring system 300 in accordance with another embodiment of the disclosure. The in-situ process monitoring system 300 is similar to that of system 100, and includes many of the same elements as noted by the same reference numbers. However, in this exemplary embodiment, the specimen processing system 340 is a two-photon polymerization processing system, and the specimen 350 is a resin. This is just to illustrate one application, among many, of the CARS microscopy system 110. In this example, the CARS microscopy system 110 may be configured to measure the degree of polymerization while the resin is undergoing the TPP process performed by the specimen processing system 340. In this regards, the density of the polymerized portion of the resin 350 is greater than the non-polymerized portion of the resin. Thus, the CARS microscopy system 110 would be able to provide a three-dimensional image of the density of the resin 350 while undergoing the TPP process. It shall be understood that the specimen need not be limited to a resin, but may encompass many distinct materials.

Figure 3B:
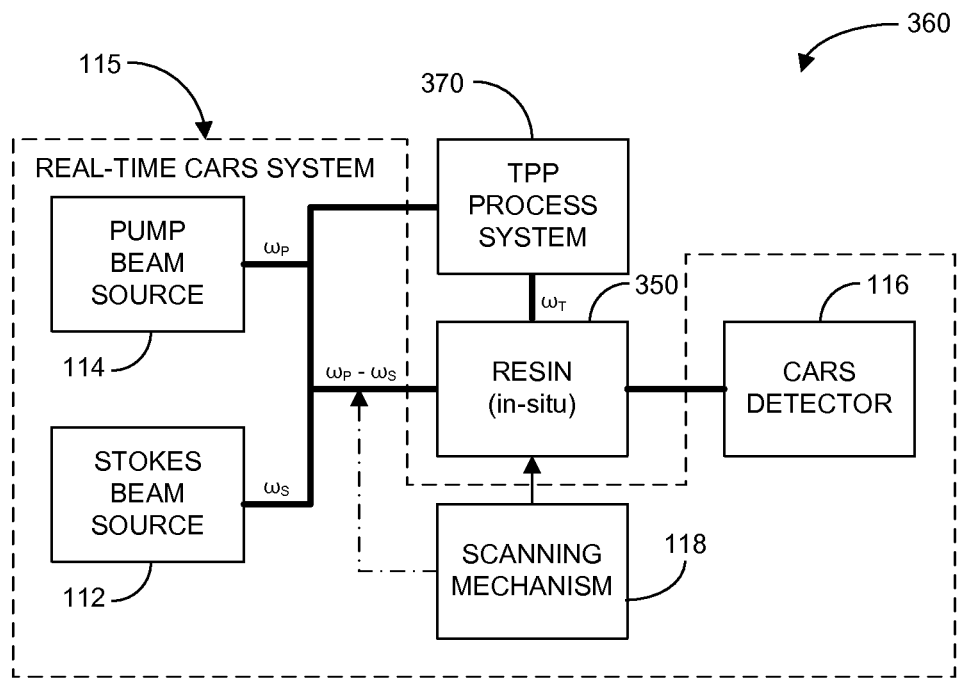
FIG. 3B illustrates a block diagram of an exemplary real-time process monitoring system in accordance with another aspect of the disclosure.

FIG. 3B illustrates a block diagram of an exemplary "real-time" process monitoring system 360 in accordance with another aspect of the disclosure. The real-time process monitoring system 360 is similar to the system 300 previously described, and includes many of the same elements as noted by the same reference numbers. The "real-time" process monitoring system 360 differs with respect to system 300 in that it includes a real-time CARS system 115 in which a portion of the pump radiation beam is sent to a TPP process system 370. The TPP process system 370 generates a TPP radiation beam $\omega_T$ that is derived at least in part from the pump radiation beam $\omega_P$. The specimen 350 (e.g., a resin) is subjected to the TPP radiation beam $\omega_T$ to induce polymerization in the specimen, and to ultimately form a defined microstructure based on the TPP process. In such a system 360, the CARS system 115 is able to monitor in "real-time" the specimen 350, while the specimen is undergoing the TPP process performed by the TPP process system 370.

Figure 4:
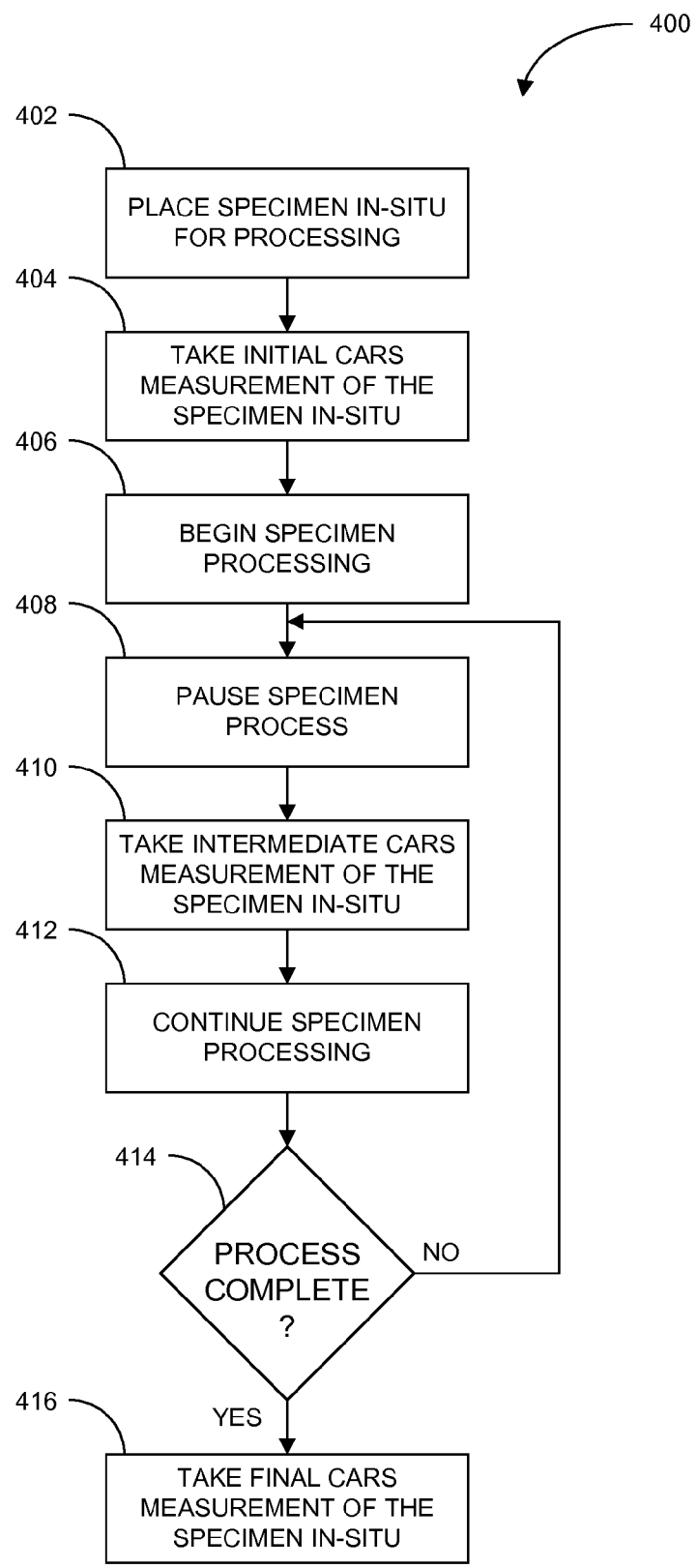
FIG. 4 illustrates a flow diagram of an exemplary method of monitoring a specimen in-situ undergoing a process in accordance with another aspect of the disclosure.

FIG. 4 illustrates a flow diagram of an exemplary method 400 of monitoring a specimen in-situ undergoing a process in accordance with another aspect of the disclosure. In this example, the processing of the specimen is paused or temporarily halted one or more times in order to perform one or more CARS measurement on the specimen, respectively.

More specifically, according to the method 400, the specimen is placed in-situ for processing (block 402). Then, an initial CARS measurement of the specimen may be taken in order to characterize the specimen at the beginning of the process (block 404). Then, the processing of the specimen is begun (block 406). The processing of the specimen may be paused prior to completion of the process to take a measurement of the specimen (block 408). While the process is paused, a CARS measurement of the specimen in-situ is taken (block 410). After the measurement, the process is resumed (block 412). Prior to completion of the process, additional intermediate CARS measurement of the specimen may be taken. Thus, in this regards, if the process is not complete pursuant to block 414, the operations 408 through 410 may be repeated to obtain additional CARS measurement of the specimen as desired. When the process is complete pursuant to block 414, a final CARS measurement of the specimen may be taken (block 416).

Figure 5:
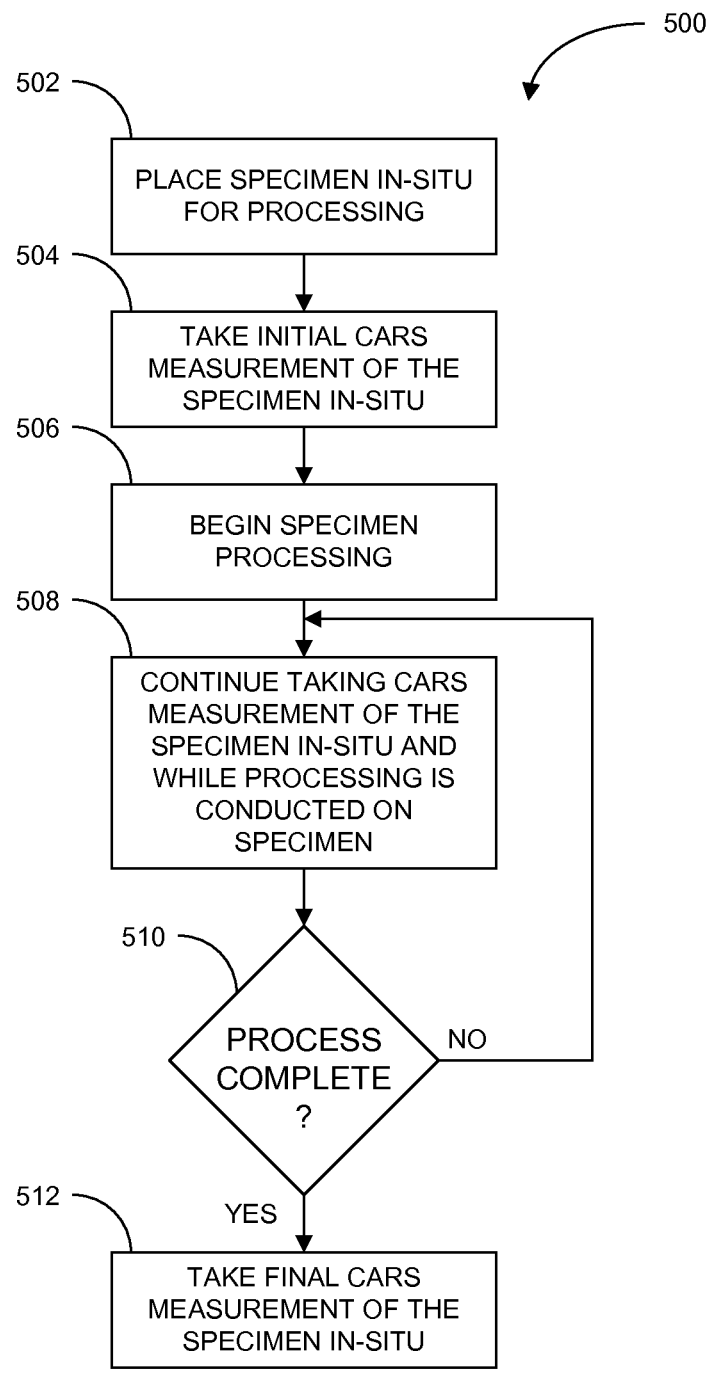
FIG. 5 illustrates a flow diagram of another exemplary method of monitoring a specimen in-situ undergoing a process in accordance with another aspect of the disclosure.

FIG. 5 illustrates a flow diagram of another exemplary method 500 of monitoring a specimen in-situ undergoing a process in accordance with another aspect of the disclosure. In the previous example, although the specimen was in-situ, the process being performed on the specimen was paused or temporarily halted for the purpose of taking a CARS measurement of the specimen. In this example, the process is not halted, and the CARS measurement of the specimen is taken while the process is being performed on the specimen.

More specifically, according to the method 500, the specimen is placed in-situ for processing (block 502). Then, an initial CARS measurement of the specimen may be taken in order to characterize the specimen at the beginning of the process (block 504). Then, the processing of the specimen is begun (block 506). The CARS measurement of the specimen may be taken in a continuous, periodic, or in another manner, while the specimen is undergoing the defined process (block 508). Prior to completion of the process pursuant to block 510, additional CARS measurements of the specimen may be taken while the specimen is being processed (block 508). When the process is complete pursuant to block 512, a final CARS measurement of the specimen may be taken (block 512).

While the invention has been described in connection with various embodiments, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

What is claimed is:

1. A system for in-situ monitoring of a specimen while undergoing a defined process, comprising:
   a processing system adapted to perform the defined process on the specimen, wherein the processing system comprises a two-photon polymerization processing system adapted to perform a TPP process on the specimen; and
   a coherent anti-Stokes Raman scattering (CARS) microscopy system adapted to in-situ monitor the specimen, wherein the CARS system is adapted to generate a first radiation beam for real-time monitoring of the specimen, wherein the processing system is adapted to generate a second radiation beam for performing the TPP process on the specimen, and wherein the second radiation beam is derived from the first radiation beam.

2. The system of claim 1, wherein the CARS microscopy system is adapted to in-situ monitor the specimen simultaneous with the defined process being performed on the specimen by the processing system.

3. The system of claim 1, wherein the processing system is adapted to pause the defined process being performed on the specimen, and wherein the CARS microscopy system is adapted to perform the in-situ monitoring of the specimen while the processing system has paused the defined process performed on the specimen.

4. The system of claim 1, further comprising a scanning mechanism adapted to subject distinct portions of the specimen to the in-situ monitoring by the CARS microscopy system.

5. The system of claim 4, wherein the scanning mechanism is adapted to move the specimen.

6. The system of claim 4, wherein the scanning mechanism is adapted to steer the first radiation beam to different regions of the specimen while the specimen remains stationary.

7. The system of claim 4, wherein the CARS system comprises:
   a Stokes beam source adapted to generate a third radiation beam directed at the specimen; and
   a pump beam source adapted to generate the first radiation beam directed at the specimen;
   wherein the scanning mechanism is adapted to steer the first and third radiation beams to different regions of the specimen while the specimen remains stationary.

8. The system of claim 1, wherein the CARS microscopy system comprises:
   a Stokes beam source adapted to generate a third radiation beam with a frequency $\omega_S$; and
   a pump beam source adapted to generate the first radiation beam with a frequency $\omega_P$.

9. The system of claim 8, wherein the CARS microscopy system is adapted to initially combine the first radiation beam and the third radiation beam substantially at the specimen.

10. The system of claim 8, wherein the CARS microscopy system is adapted to combine the first radiation beam and the third radiation beam to generate an incident radiation beam directed at the specimen, wherein the incident radiation beam has a frequency of substantially $\omega_P-\omega_S$ or $\omega_S-\omega_P$.

11. The system of claim 1, wherein the first radiation beam source is adapted to generate an incident radiation beam upon the specimen; and further comprising:
   a detector adapted to detect radiation emitted by the specimen in response to the incident radiation beam.

12. The system of claim 11, wherein the emitted radiation by the specimen provides information regarding one or more properties of the specimen.

13. The system of claim 12, wherein the one or more properties of the specimen comprises a density of the specimen.

14. The system of claim 12, wherein the specimen comprises a resin, and wherein the one or more properties comprises a degree of polymerization of the resin.

15. A method of in-situ monitoring of a specimen while undergoing a defined process, comprising:
    performing the defined process on the specimen, wherein the defined process comprises directing a first radiation beam at the specimen; and
    in-situ monitoring the specimen using coherent anti-Stokes Raman scattering (CARS) microscopy, wherein the in-situ monitoring the specimen comprises directing a second radiation beam at the specimen, and wherein the first and second radiation beams are derived from a common radiation source.

16. The method of claim 15, wherein in-situ monitoring of the specimen comprises monitoring the specimen while the defined process is being performed on the specimen.

17. The method of claim 15, further comprising pausing the defined process being performed on the specimen, wherein the in-situ monitoring of the specimen is performed while the defined process performed on the specimen is paused.

18. The method of claim 15, wherein in-situ monitoring of the specimen comprises:
    subjecting distinct portions of the specimen to the second radiation beam; and
    detecting an emitted radiation from the specimen in response to the second radiation beam.

19. A method of real-time monitoring of a resin undergoing a two-photon polymerization (TPP) process, comprising:
    performing the TPP process on the resin by directing a first radiation beam at the resin; and
    in-situ monitoring of the resin using coherent anti-Stokes Raman scattering (CARS) microscopy while the resin is undergoing the TPP process, wherein in-situ monitoring the resin comprises directing a second radiation beam at the resin, and wherein the first and second radiation beams are derived from a common radiation source.

* * * * *